(12) United States Patent
Bhoja (10) Patent No.: US 6,731,692 B1
(45) Date of Patent: May 4, 2004

(54) SYMBOL ENCODING AND DECODING ARCHITECTURE FOR TRELLIS-CODED MODULATION IN GIGABIT ETHERNET

(75) Inventor: Sudeep Bhoja, Santa Clara, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/533,922

(22) Filed: Mar. 23, 2000

(51) Int. Cl.$^7$ .............................................. H04L 25/34
(52) U.S. Cl. ....................... 375/286; 375/264; 375/265; 375/340; 375/342; 375/287; 714/792; 714/794
(58) Field of Search ................................ 375/264–265, 375/340–342, 286–287; 714/792, 794

(56) References Cited

U.S. PATENT DOCUMENTS

| | | | | |
|---|---|---|---|---|
| 5,579,342 A | * | 11/1996 | Crozier | 375/296 |
| 5,659,579 A | * | 8/1997 | Herzberg | 375/262 |
| 5,745,528 A | * | 4/1998 | Fimoff et al. | 375/316 |
| 5,881,074 A | * | 3/1999 | Rao | 714/786 |
| 5,923,711 A | * | 7/1999 | Willming | 375/287 |
| 5,987,070 A | * | 11/1999 | Fimoff et al. | 375/286 |
| 6,288,657 B1 | * | 9/2001 | Ino | 341/102 |
| 6,404,828 B2 | * | 6/2002 | Kaewell, Jr. | 375/341 |

OTHER PUBLICATIONS

Physical Layer Parameters and Specifications for 1000 Mb/s Operation Over 4 Pair of Category 5 Balanced Copper Cabling, Type 1000BASE–T; IEEE Std. 802–3ab; 1999; pp. 15–131.

Gottfried Ungerboeck; Channel Coding with Multilevel/Phase Signals; IEEE Transactions on Information Theory, vol. IT–28, No. 1; Jan. 1982; pp. 55–67.

\* cited by examiner

*Primary Examiner*—Mohammad H. Ghayour
*Assistant Examiner*—Qutub Ghulamali (57) ABSTRACT

A method of encoding a plural-bit data word as a plurality of multi-level symbols, where each of the plurality of multi-level symbols has a value selected from a predetermined plurality of levels. The method includes first translating each one of the selected bit positions of the plural-bit data word to one of the levels. When the contents of a predetermined one of the bits of the data word is a predetermined value, the method provides a second translation of each of the selected bit positions of the plural-bit data word to one of the levels. The method further includes generating a plural-bit offset word from predetermined bit positions of the data word and generating the multi-level symbols by addition of the offset word to the translated levels. One embodiment of the invention provides that the multi-level symbols are assigned a five-level code and the codes are treated as twos-complement numbers.

13 Claims, 8 Drawing Sheets

| PRESENT STATE | INPUT | NEXT STATE | OUTPUT | (DECIMAL) |
|---|---|---|---|---|
| 00 | 0 | 00 | 00 | (0) |
| 00 | 1 | 10 | 11 | (3) |
| 01 | 0 | 00 | 11 | (3) |
| 01 | 1 | 10 | 00 | (0) |
| 10 | 0 | 01 | 10 | (2) |
| 10 | 1 | 11 | 01 | (1) |
| 11 | 0 | 01 | 01 | (1) |
| 11 | 1 | 11 | 10 | (2) |

SYMBOL ENCODING AND DECODING ARCHITECTURE FOR TRELLIS-CODED MODULATION IN GIGABIT ETHERNET

BACKGROUND OF THE INVENTION

1. Field of the Invention

This invention relates in general to error correction coding, and more particularly, to a trellis encoder/decoder constellation mapping from binary data to symbols and inverse mapping suited to error-correction on a high-speed data channel.

2. Description of Related Art

To minimize the effects of additive white Gaussian noise (AWGN) as well as the effects of Rayleigh fading and other channel impairments, one or more error encoding techniques are used in order to provide for accurate transmission and detection of data, especially when very high level modulation schemes are employed.

Trellis-coded modulation is a forward error correction coding technique which is also well known in the art. Trellis codes are convolutional codes that are designed and optimized according to a specific modulation scheme. A convolutional encoder encodes information symbols based upon the present input symbol and the state of the encoder. The present state of the encoder is determined by the symbols which previously entered the encoder. That is, the encoded symbol is a function of the present input symbol and also symbols that entered the encoder before the present input symbol. Thus, a convolutional encoder has memory.

Convolutional codes are typically implemented by shift registers and summers. The next state and the output of the encoder are functions of the present state of the register or look-up table (i.e., the value of the bits presently stored within the register or look-up table memory), and the input to the register or look-up table.

Figure 1A:
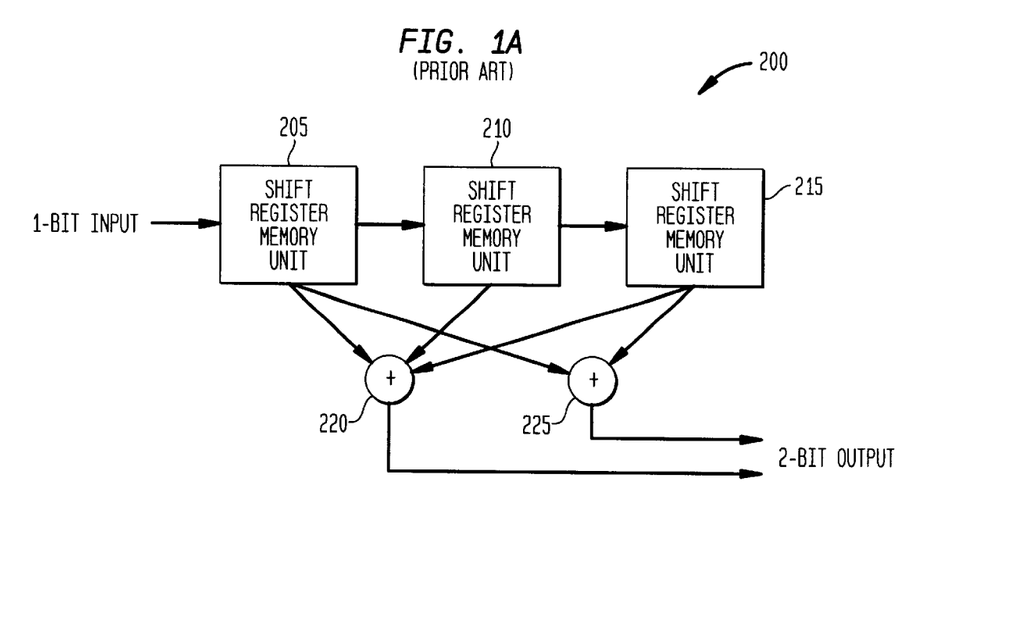
FIG. 1A is an exemplary convolutional encoder block diagram.
Figure 1B:
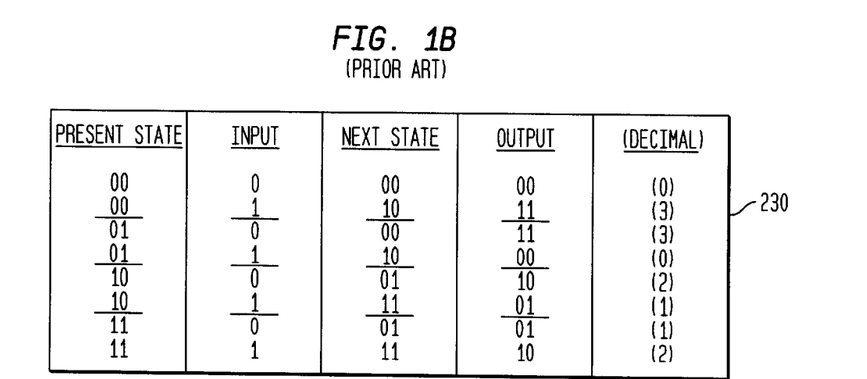
FIG. 1B is the state table of the encoder.

FIG. 1A and the accompanying table 230 shown in FIG. 1B illustrate an exemplary embodiment of a convolutional encoder 200 implemented by means of shift registers, and the corresponding state table. The encoder 200 is simply shown here in order to illustrate the operation and implementation of convolutional encoder, and is not to be construed as an implementation of the trellis encoder used in accordance with the present invention. The encoder 200 includes shift register memory units 205, 210, 215, as well as summers 220, 225. A one-bit input is encoded into a two-bit output to provide rate ½ encoding.

Assuming an initial state of 000 (i.e., the register units 205, 210, 215 contain bit values of 0, 0, 0, respectively), and an input value of 0, the next state of the encoder 200 is 000 (a zero bit value shifts in while a zero value shifts out). Consequently, the value of the two bits at the output is 00. This is represented in the first line of the state table 230 if FIG. 1B. Note, however, that the present and next state columns only indicate two-bit values since the last state bit is always shifted out and is not significant in determining the next state. Thus, when moving from state to state, the encoder 200 can be considered to have four possible present states and four next states, each two-bit values. As another example, assume the encoder 200 to be in the present state 10 (i.e., the first two registers contain 1,0). An input of 1 will move the encoder 200 to the next state of 11 (i.e., the first two registers contain 1,1) and generate an output of 01 (decimal 1). This process is repeated as each successive bit enters the encoder 200 so that a state diagram can be constructed which shows the possible state transitions of the encoder 200 with the accompanying input and output values which correspond to those transitions.

Figure 2:
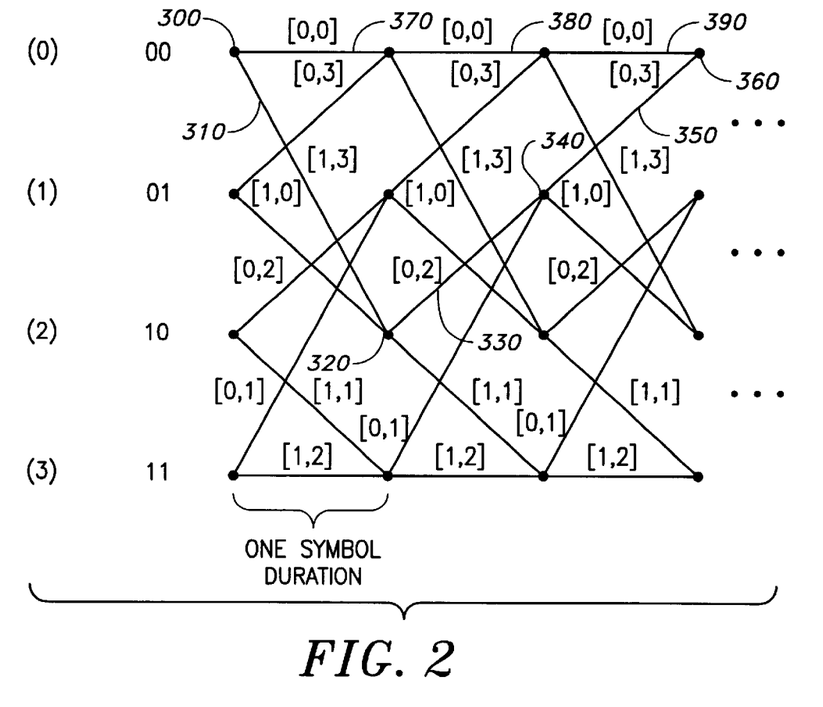
FIG. 2 is a trellis state transition diagram for the encoder of FIG. 1.

FIG. 2 is a state transition diagram which indicates the possible state transitions of the encoder 200 of FIG. 1, along with the input and output values corresponding to the possible transitions. Because the state transition diagram resembles a trellis in form, such diagrams are often called trellis diagrams, hence the name "trellis coding." Each dot on the trellis diagram of FIG. 2 represents a state of the encoder 200. Dots in the same horizontal row correspond to the same state at different times. Dots in the same vertical column represent different states at the same time (i.e., within the duration of the same symbol). Branches between the dots represent possible state transition paths. Thus, for example, there is a branch between the state 01 and the state 00 which indicates that, given the appropriate input, the encoder 200 could go from state 01 to state 00. Since there is no branch between states 01 and 11, nor is there a branch between the states 01 and 11, it is possible for the encoder 200 to go from state 01 to either of the states 11 or 01 within one symbol duration.

The number pair along each of the branches depicted in FIG. 2 indicate the [input, output] values which correspond to a given branch. The first number represents the input which causes the transition, while the second number represents the output value resultant upon this transition.

As seen from the trellis diagram of FIG. 2, the possible state transitions for the encoder 200 are the same for each successive symbol. Thus, the same pattern repeats over and over again for each symbol duration.

As an example, assume the encoder 200 begins in the state 0 (binary 00), represented by a dot 300 in FIG. 2. Upon application of an input value 1 to the encoder 200, the encoder 200 goes from state 0 to state 2 (binary 10), represented by a dot 320, via a path 310. Upon completion of the transition, the encoder 200 outputs a value 3 (binary 11). If the value of the next bit applied to the input is 0, the encoder 200 transitions from state 2 to state 1, represented by a dot 340, via a path 330, while the output of the encoder 200 assumes a value of 2. Finally, upon application of input bit of 0, the encoder 200 moves from the state 1 to the state 0, represented by a dot 360, via a path 350. Upon entering the 0, the encoder 200 outputs a value 3. Thus, in the foregoing example, input bits 1-0-1 are encoded by the encoder 200 into output bits 11-10-11, or 3-2-3 in decimal. At the same time, the encoder 200 has transitioned from the state 0 to the state 2, to the state 1, and back to the state 0.

As further explained below, convolutional encoding (and Viterbi decoding) provides for a reduced number of detected errors at the receiver. Consider again the trellis diagram of FIG. 2. For example, assume that a three-bit data stream 1-0-0 is properly encoded as 11-10-11 by the encoder 200 as described above. Also suppose that the receiver detects the transmitted signal erroneously as 11-11-11. In order to determine what the original transmitted data is, the decoder performs a maximum likelihood decision based upon the possible state transition paths which the encoder 200 might have taken. Since the encoder is typically set to state 0 at initialization, the decoder assumes that the detected sequence of data bits began in state 0. The decoder then examines all of the paths which began at state 0 and terminate at a state three symbols later as depicted in FIG. 2 for the purpose of illustration. For instance, for an ending point at the state 0, at the point 360, there are two possible paths which the encoder may have taken: the path 310, 330, 350, or the paths 370, 380, 390. Of course, all the other paths of three symbol duration are also examined to determine the likelihood that the detected bit sequence followed these possible paths, but for the sake of simplicity of illustration, only the paths from state 0 to state 0 are considered here.

In order to identify the most likely path, the decoder determines the probability that the detected data sequence was produced by the first path (e.g., the path 310, 330, 350), the probability that the detected data sequence was generated by the second path (e.g., the path 370, 380, 390), and so on until a probability has been calculated for each possible path. The path having the highest probability is then selected as the actual path according to either hard or soft decision methods described in greater detail below.

Typically, trellis decoding techniques calculate path probabilities based upon either Hamming or Euclidean distances between the detected signal and the signals generated by the possible trellis paths. In accordance with the teachings of the present invention, Euclidean distances are used as the measure of path probability, as discussed in greater detail below. However, in order to provide a clearer understanding of the method of determining the probability of a possible trellis path, a brief discussion of Hamming distance is also provided.

Hamming distance is defined as the number of bits by which two binary sequences differ. For example, the hamming distance between the binary words 110 and 101 is two, while the hamming distance between the binary words 111 and 011 is one, etc. Based upon a Hamming distance evaluation of the possible paths, the probability that a given path has generated a detected data sequence can be determined s follows. Assuming, as stated above, that the detected data sequence is 11-11-11 (with a proper data sequence 11-10-11), and the possible paths are the paths 310, 330, 350 and 370, 380, 390, the Hamming distance between the detected signal 11-11-11 and the path 310, 330, 350 is 1. That is, because the path 310 generates an output of 3(11), and path 330 generates an output of 2(10), and the path 350 generates an output of 3(11), the binary sequence generated by the path 310, 330, 350 is 11-10-11. This sequence differs from the detected sequence 11-11-11 by a Hamming distance of 1. The Hamming distance between the detected signal 11-11-11 and the signal generated by the path 370, 380, 390 is 6 since the path 370, 380, 390 results in an output binary sequence of 00-00-00. Thus, it is much more likely that the detected sequence 11-11-11 was generated by the path 310, 330, 350, than by the path 370, 380, 390. Therefore, it is more likely that the sequence of input bits is 1-0-0.

Another measure of the probability that a given path has generated a binary sequence is based upon Euclidean distance. Euclidean distance is the length of a straight line between points on a signal constellation. In general, probability measures based upon Euclidean distances exhibit better accuracy than probability measures based on Hamming distance. This is because probability measurements based upon Euclidean distance take into account the received signal phase and amplitude information which is discarded when using Hamming distance as a probability metric.

For example, FIGS. 3A–3D illustrate a simple 4-PSK modulation signal constellation having four defined points 400, 410, 420, 430 equidistant from the origin and corresponding to output values, 00, 01, 10, and 11, respectively. Suppose a sequence of received data symbols are detected to have phase and amplitude values which are represented by the vectors r1–r3 in FIGS. 3A–3C. Using conventional Hamming decoding techniques, the vectors r1–r3 would simply be approximated as the data points, 00, 10, and 00, respectively, so that valuable phase and amplitude information is lost about the actually detected signal sequence. In accordance with Euclidean techniques, however, the phase and amplitude of the received signal are factored into the determination of the path probability.

Figure 3A:
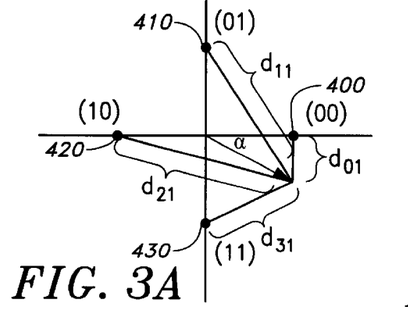
FIGS. 3A–3C are 4-PSK signal constellations which illustrate trellis path probabilities according to Euclidian distances along the trellis diagram of FIG. 3D.
Figure 3B:
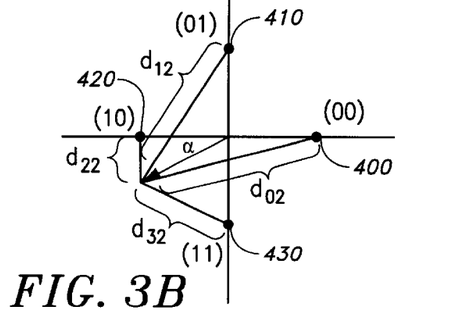
Figure 3C:
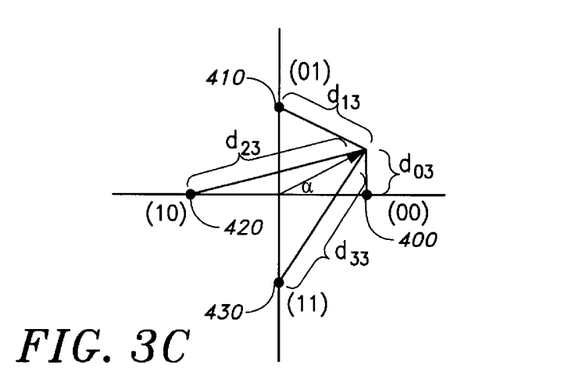
Figure 3D:
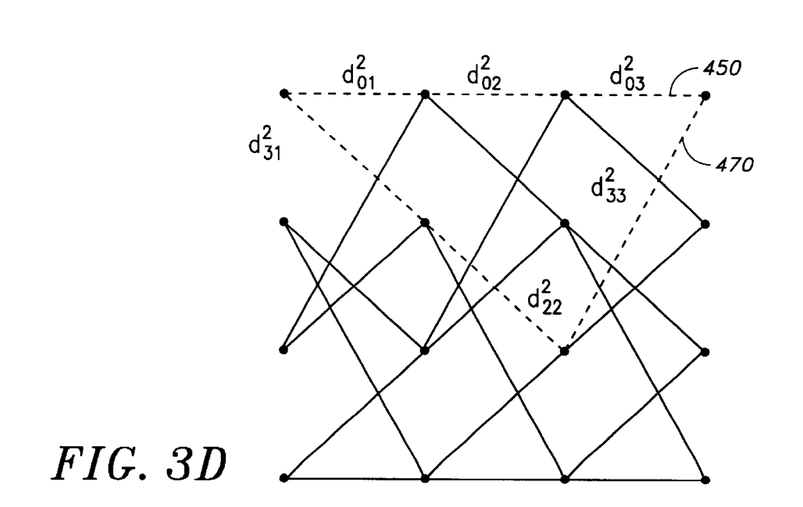

As shown in FIG. 3D, the probability that the detected signal has been generated by the trellis path represented by the dashed line 450 is a decreasing function of the sum of the square of the Euclidean distances d01, d02, and d03 (depicted in FIGS. 3A–3C), while the probability that the detected signal has been generated by the trellis path represented by the dashed/dotted line 470 is a function of the sum of the squares of the Euclidean distances d31, d22, and d33. The greater the sum of the squares of the Euclidian distances along a given path, the less likely that path is to be the one which generated the detected signal sequence. In this manner, a more accurate estimation of the transmitted data sequence can be obtained.

It should be understood, of course, that as the number of points in the signal constellation (i.e., the number of possible output values) and the number of states in the trellis encoder increase, the number of possible trellis paths increases as well. Thus, for example, a rate ¾ trellis encoder which operates in conjunction with a 16 point constellation will have 8 possible branches merging into and diverging out of each state (represented by a point) on the trellis state transition diagram. In these systems, the probability associated with each path merging into a state point is determined. Once these probabilities have been compared, the path with the highest probability is determined and corresponding data bits in that path are selected as the decoded sequences.

The selection of a given path may be made in accordance with block or symbol-by-symbol decision methods. In the case of a block decision, a predetermined number of received signals forming a set (e.g., 1,000 symbols) are fed into the decoder. The decoder then starts with the first signal and constructs a trellis with associated metrics and path histories for the whole set of 1,000 symbols. The trellis transition path that is most probable is then selected as the path which generated the detected symbols. The data input which would have generated this path is then determined as the decoded data sequence. Absent any uncorrected errors, this data sequence should correspond to the data sequence fed into the encoder on the transmitter side of the communication system. The process is then repeated with the next block of symbols, and so on.

For symbol-by-symbol decisions, a predetermined number of received signals are fed into the decoder. For example, assume 25 signals are fed into the decoder. Once the $25^{th}$ symbol is entered, the trellis decoder determines what path was most probable. The input symbol which would have generated the first branch of the most probable path is then selected as the output of the decoder. The next (e.g., the $26^{th}$) received signal is then fed into the decoder and another determination is made of the most probable path for the last 25 symbols (i.e., excluding the first symbol). The input symbol which would have generated the first branch of the most probable path (i.e., the path for the most recently detected 25 symbols) is then selected as the next output of the decoder. This procedure is carried on symbol-by-symbol in real time so that only one symbol at a time is decoded for output as opposed to an entire block of data at a time.

Gottfried Ungerboeck, in a paper entitled "Channel Coding with Multilevel/Phase Signals," published January, 1982 in IEEE Trans. Info. Thy., Vol. IT-28, No. 1, and herein incorporated by reference, argued that error performance of convolutional codes could be improved if designed by maximizing the Euclidean distances between trellis paths which merge into and out of the same state. This is accomplished by tailoring the convolutional coding scheme to the signal constellation of a given modulation technique so that the operations of error coding and modulation are essentially combined.

Figure 4:
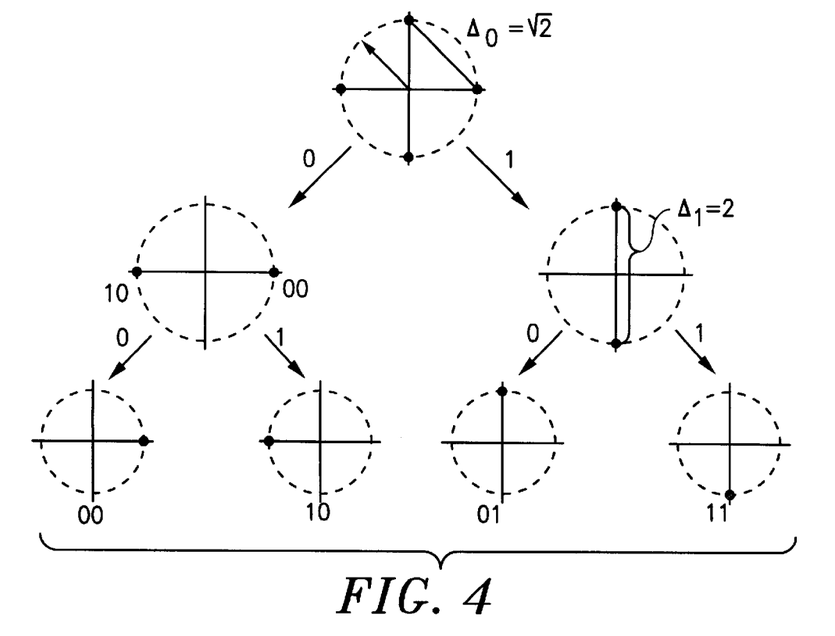
FIG. 4 is a trellis set partitioning tree for a 4-PSK signal constellation.

Take as a simple example a 4-PSK signal constellation as shown in FIG. 4. The possible outputs of the trellis encoder on the transmitter side are presented as four points which are phase shifted from one another by phase differences of 90°. In any trellis coding scheme the possible output values, as represented in the signal constellation, as well as the states of the trellis decoder are both considered. In order to provide the maximum distinction between encoded signals, so as to allow for more accurate decoding, it is advantageous to assure that transitions to and from the same state differ greatly in their output values (in terms of their Euclidean distances). For example, the trellis diagram of FIG. 2, which may, for example, describe state transitions for the 4-PSK signal constellation of FIG. 4, has the branches 370, 310 diverging from the same state point 300. Note that the output value for the state transition branch 310 is 3, and the output value for the state transition branch 370 is 0. In accordance with the Ungerboeck teaching, these two output values differ by the maximum Euclidean distance (i.e., a Euclidean distance of Δ=2 as represented in FIG. 4). In a similar way, state transitions resulting in the same output values are assigned as transitions between two different states. Note, for instance, that the transition path 310 which results in an output value of 3 advances from state 00 to state 10, while a transition path 395 which also results in an output value of 3, advances from state 01 to state 00. The Ungerboeck method thus assures good discrimination between the encoded data signals.

The most common method of trellis encoding in accordance with Ungerboeck's teachings is set partitioning, of which a simple example is shown in FIG. 4. By partitioning the original 4-PSK signal into two sets of diametrically opposed 2-PSK signals based upon the state of the trellis encoder, the maximum Euclidean distance can be maintained between outputs merging into or diverging out of the same state. Such set partitioning diagrams are commonly referred to as trellis coding trees.

SUMMARY OF THE INVENTION

The present invention provides a method of encoding a plural-bit data word as a plurality of multi-level symbols, each having a value selected from a predetermined plurality of levels, comprising the steps of a first translation of each of selected bit positions of the data word to one of the levels, when the contents of a predetermined one of the data word bits is a predetermined value, a second translation of each of the selected data word bit positions to one of the levels, generating a plural-bit offset word from predetermined bit positions of the data word and generating the multi-level symbols by addition of the offset word to the translated levels.

In a further aspect of the encoding method provided by the invention the multi-level symbols are assigned a five-level code, comprising a first, a second, a third, a fourth and a fifth code level, and wherein the first translation step further includes the step of translating a first predetermined bit value to the third code level and a second predetermined bit value to the second code level. Further to the encoding method wherein the data-word comprises the bits Sd[8:0], the offset-word comprises the bits V0, V1, V2 and V3 and the offset-word generating step further includes the step when the contents of said predetermined one of the data word bits is the predetermined value, generating the bits V0, V1, V2 and V3 according to the equations:

$V0=Sd[4]$ $V1=Sd[4]\char`\^ Sd[6]$ $V2=Sd[4]\char`\^ Sd[6]\char`\^ Sd[7]$ $V3=Sd[4]\char`\^ Sd[7]\char`\^ Sd[8]$, where ^ is the XOR operation.

The encoding method further provides wherein the data-word comprises the bits Sd[8:0], the offset-word comprises the bits V0, V1, V2 and V3 and the offset-word generating step further includes the step when the contents of said predetermined one of the data word bits is the predetermined value, generating the bits V0, V1, V2 and V3 according to the equations:

$V0=I4$ $V1=I4\char`\^ Sd[6]$ $V2=I4\char`\^ Sd[6]\char`\^ Sd[7]$ $V3=I4\char`\^ Sd[7]\char`\^ Sd[8]$, where I4 is assigned a binary value according to the table:

| Sd[4] | Sd[3] | I4 |
|---|---|---|
| 0 | 0 | 0 |
| 0 | 1 | Sd[6] ^ Sd[7] |
| 1 | 0 | Sd[6] |
| 1 | 1 | Sd[7] ^ Sd[8] | where ^ is the XOR operation.

In yet another aspect of the encoding method of the instant invention each of the multilevel symbols is encoded on a predetermined one of four signal lines and wherein the second translation step further includes the steps, when the contents of said predetermined one of the data word bits is said predetermined value, adding the fifth code value to one of the signal lines as selected by predetermined bit positions of the data word, discarding the symbol on the fourth signal line; and selecting the symbols on the remaining three signal lines from the symbols on the lines to which no fifth code value is added.

The encoding method according to the invention further provides that wherein the code levels are treated as twos-complement numbers, wherein each of the multi-level symbols is encoded on a predetermined one of four signal lines and wherein the offset-word addition step includes the step twos-complement addition of the offset-word bits to the code-levels on respective ones of the signal lines. And further that wherein the code levels are treated as twos-complement numbers, wherein each multi-level symbols is encoded on a predetermined one of four signal lines and wherein the offset-word addition step includes the step, when the contents of said predetermined one of the data word bits is the predetermined value, twos-complement addition of the offset-word bits to said code-levels on respective ones of the signal lines symbols on the three signal lines to which no fifth code value is added.

Also provided by the invention is a method of decoding a plurality of multi-level symbols as a plural-bit data word, each symbol having a value selected from a five-level code, each code level treated as a twos-complement number, comprising the steps of; a translation of each of selected bit positions of the twos-complement representation to predetermined bit positions of the data word, when the contents of a predetermined bit positions of a twos-complement representation of one of the symbol is a predetermined value, setting of predetermined bit positions of the data word to a selected value; generating a plural-bit offset word from predetermined bit positions of the twos-complement representation of each of the symbols; and generating predetermined bit positions of the data-word from the offset word to a selected value, dependent on the contents of the predetermined bit positions of a twos-complement representation of one of the symbol being the predetermined value.

The decoding method of the invention further provides that wherein the five-level code comprises a first, a second, a third, a fourth and a fifth code level, wherein the contents of a predetermined bit positions of a twos-complement representation of one of said symbol is the fifth level, wherein each multi-level symbols is encoded on a predetermined one of four signal lines, wherein the twos-complement representation of the four multi-level symbols comprises the bits A[2:0], B[2:0], C[2:0] and D[2:0], the data-word comprises the bits Sd[8:0], and wherein the translation step further includes the steps:

A[2]=Sd[0]
B[2]=Sd[1]
C[2]=Sd[2]
D[2]=Sd[3].

In another aspect of the decoding method wherein the offset-word comprises the bits V0, V1, V2 and V3 and the offset-word generating step further includes the steps:

V0=A[0]
V1=B[0]
V2=C[0]
V3=D[0].

The decoding method of the invention also calls for when the step of setting of predetermined bit positions of the data word to a selected value further includes the steps:

Sd[6]=V0^V1
Sd[7]=V1^V2
Sd[8]=V0^V1^V2^V3, where ^ is the XOR operation. And the decoding method provided by the invention wherein when the contents of the predetermined bit positions of the twos-complement represents the fifth code level, the step of setting of predetermined bit positions of the data word to a selected value further includes the steps;

Sd[4]=V0
Sd[5]=0.

The decoding method in yet another aspect of the invention provides that wherein when the contents of the predetermined bit positions of the twos-complement represents the fifth code level, the step of setting of predetermined bit positions of the data word to a selected value further includes the steps: Sd[5:3]=100, if A[2:0]=the fifth code level, Sd[5:3]=110, if B[2:0]=the fifth code level, Sd[5:3]= 101, if C[2:0]=the fifth code level, Sd[5:3]=111, if D[2:0]= the fifth code level; and Sd[0:2] is selected from compacted bits of Sd[0:3], dependent on which of the A[2:0], B[2:0], C[2:0], D[2:0]=the fifth code level.

DETAILED DESCRIPTION OF THE INVENTION

The present invention includes a specially designed trellis encoder/decoder within a Gigabit Ethernet transmit/receive communication system conforming to IEEE Std. 802-3ab-1999 "Physical Layer Parameters and Specifications for 1000Mb/s Operation Over 4 Pair of Category 5 Balanced Copper Cabling, Type 1000BASE-T" incorporated herein by reference. The encoder/decoder is constructed to encode according to the method called trellis coding which has been found to work advantageously for signal constellations such as 16 Star QAM or any arbitrary signal constellation.

Figure 5:
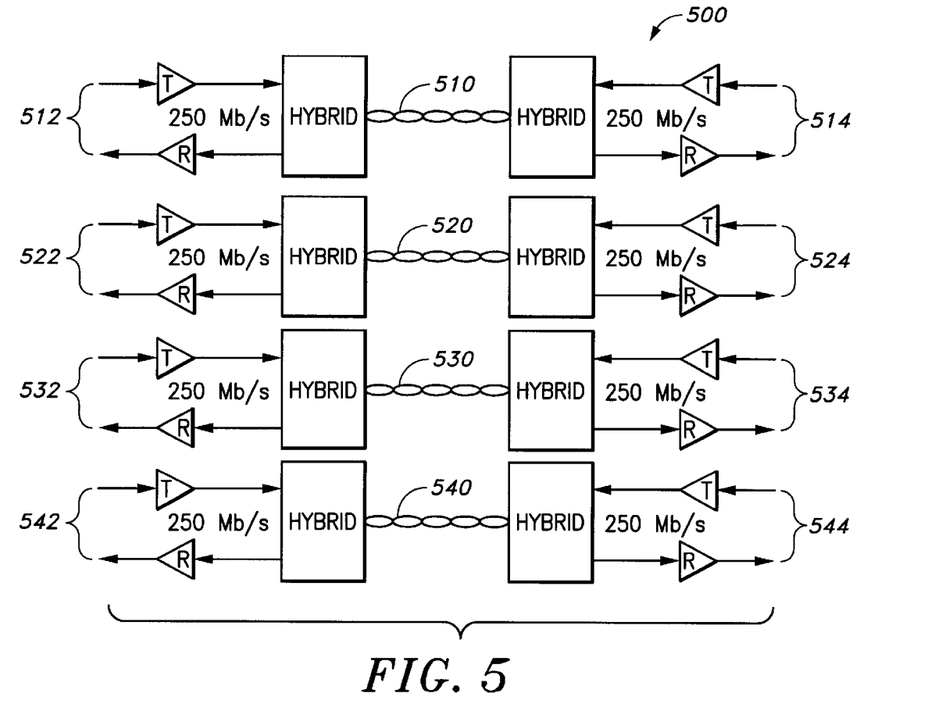
FIG. 5 is a functional block diagram of the full duplex 1000 Mb/s transmission channel afforded by the IEEE 802.3ab-1999 standard.

As shown in FIG. 5, the 1000BASE-T Physical layer 500 (PHY) employs full duplex baseband transmission over 4 pairs of Category 5 balanced cabling 510, 520, 530, and 540 and aggregate data rate of 1000 Mb/s is achieved by transmission at a data rate of 250 Mb/s over each wire pair. The use of the eight hybrid transmitter/receivers 512, 514, 522, 524, 532, 534, 542, and 544 and cancellers enables full duplex transmission by allowing symbols to be transmitted and received on the same wire pairs at the same time. Baseband signaling with a modulation rate of 125 Mbaud is used on each of the wire pairs. The transmitted symbols are selected from a four-dimensional 5-level symbol constellation. Each four-dimensional symbol can be viewed as a 4-tuple $(A_n, B_n, C_n, D_n)$ of one-dimensional quinary symbols taken from the set {2, 1, 0, −1, −2}. The 1000BASE-T standard uses a continuous signaling system; in the absence of data, Idle symbols are transmitted. Idle mode is a subset of code-groups in that each symbol is restricted to the set {2, 0, −2} to improve synchronization. Five-level Pulse Amplitude Modulation (PAM5) is employed for transmission over each wire pair. The modulation rate of 125 Mbaud matches the GMII clock rate of 125 MHz and result in a symbol period of 8 ns.

A 1000BASE-T PHY can be configured either as a MASTER PHY or as a SLAVE PHY. The MASTER-SLAVE relationship between two stations sharing a link segment is established during Auto-Negotiation (see Clause 28, 40.5, and Annex 28C of the IEEE 802.3ab standard). The MASTER PHY uses a local clock to determine the timing of transmitter operations. The SLAVE PHY recovers the clock from the received signal and uses it to determine the timing of transmitter operations, i.e., it performs loop timing. In a multi-port to single-port connection, the multi-port device is typically set to be MASTER and the single-port device is set to be SLAVE.

Figure 6:
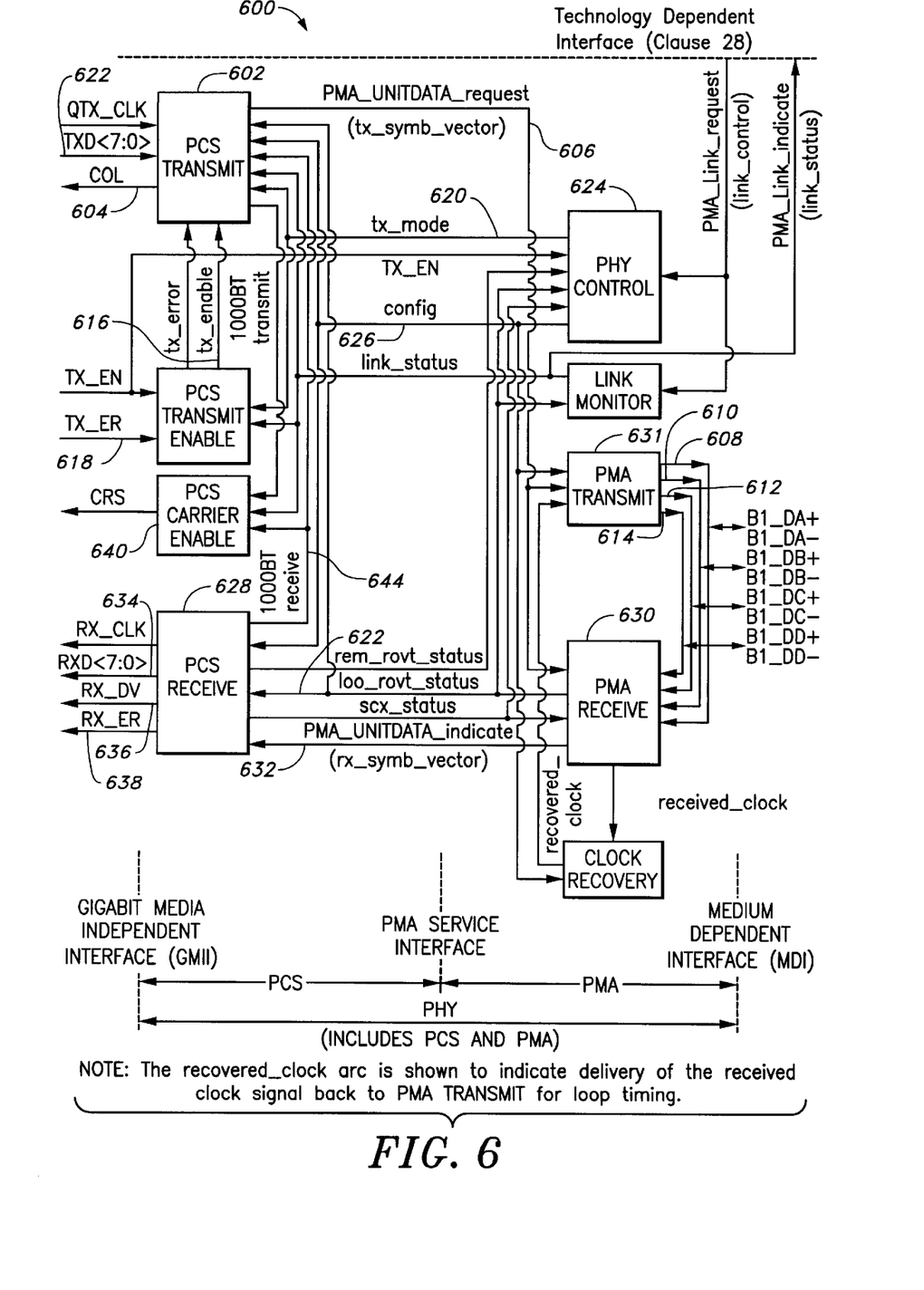
FIG. 6 is a functional block diagram of the 1000BASE-T physical layer afforded by the IEEE 802.3ab-1999 standard.

FIG. 6 shows a functional block diagram of the 1000BASE-T PHY 600. The 1000BASE-T PHY includes a Physical Coding Sublayer (PCS) and a Physical Medium Attachment (PMA).

A 1000BASE-T Physical Coding Sublayer (PCS) Transmit function 602 generates a Gigabit Media Independent Interface (GMII) signal COL 604 based on whether a reception is occurring simultaneously with transmission. The PCS Transmit function is not required to generate the GMII signal COL in a 1000BASE-T PHY that does not support half duplex operation. In each symbol period, PCS Transmit 602 generates a code-group $(A_n, B_n, C_n, D_n)$ that is transferred to the PMA via the PMA_UNITDATA.request primitive 606. The PMA transmits symbols $A_n$, $B_n$, $C_n$, $D_n$ over wire-pairs BI_DA 608, BI_DB 610, BI_DC 612, and BI_DD 614 respectively. The integer, n, is a time index that is introduced to establish a temporal relationship between different symbol periods. A symbol period, T, is nominally equal to 8 ns. In normal mode of operation, between streams of data indicated by the parameter tx_enable 616, PCS Transmit generates sequences of vectors using the encoding rules defined for the idle mode. Upon assertion of tx_enable, PCS transmit 602 passes a SSD of two consecutive vectors of four quinary symbols to the PMA, replacing the first two preamble octets. Following the SSD, each TXD<7:0>octet is encoded using a 4D-PAM5 technique into a vector of four quinary symbols until tx_enable is de-asserted. If TX_ER 618 is asserted while tx_enable 616 is also asserted, then PCS Transmit 602 passes to the PMA vectors indicating a transmit error.

If a PMA_TXMODE.indicate 620 message has the value SEND_I, PCS Transmit 602 generates sequences of code-groups according to the encoding rule in training mode. Special code-groups that use only the values {+2, 0, −2} are transmitted in this case. Training mode encoding also takes into account the value of the parameter loc_rcvr_status 622. By this mechanism, a PHY indicates the status of its own receiver to the link partner during idle transmission.

In the normal mode of operation, the PMA_TXMODE.indicate 620 message has the value SEND_N, and the PCS Transmit function 602 uses an 8B 1Q4 coding technique to generate at each symbol period code-groups that represent data, control or idle based on the code-groups defined in Table 40-1 and Table 40-2 of the IEEE Std. 802.3ab-1999. During transmission of data, the TXD<7:0>bits 622 are scrambled by the PCS using a side-stream scrambler, then encoded into a code-group of quinary symbols and transferred to the PMA. During data encoding, PCS Transmit 602 utilizes a three-state convolutional encoder.

PCS encoding involves the generation of the four-bit words $Sx_n[3:0]$, $Sy_n[3:0]$, and $Sg_n[3:0]$, from which the quinary symbols $A_n$, $B_n$, $C_n$, $D_n$ are obtained. The four-bit words $Sx_n[3:0]$, $Sy_n[3:0]$, and $Sg_n[3:0]$ are determined (as explained hereinbelow) from sequences of pseudorandom binary symbols derived from the transmit side-stream scrambler.

The PCS Transmit function 602 employs side-stream scrambling. If the parameter config provided to the PCS by the PMA PHY Control 624 function via the PMA_CONFIG.indicate 626 message assumes the value MASTER, PCS Transmit 602 shall employ $$g_M(x)=1+x^{13}+x^{33}$$

as transmitter side-stream scrambler generator polynomial. If the PMA_CONFIG.indicate message assumes the value of SLAVE, PCS Transmit shall employ $$g_S(x)=1+x^{20}+x^{33}$$

as transmitter side-stream scrambler generator polynomial.

Figure 7:
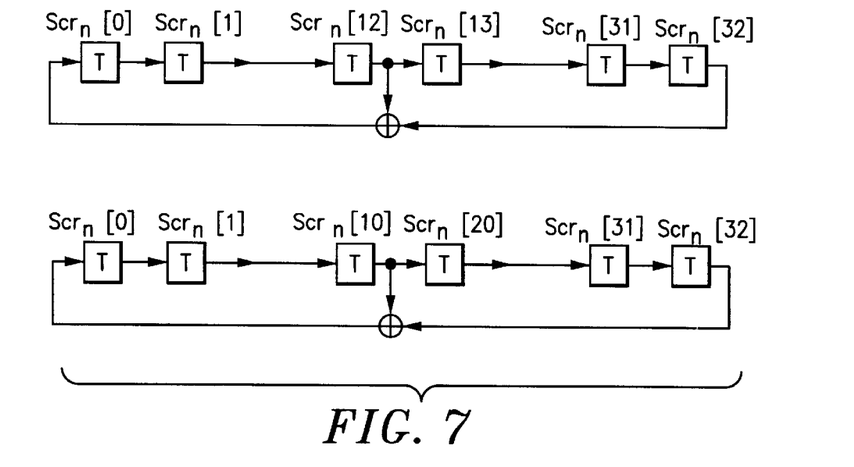
FIG. 7 is a signal flow block diagram of linear feedback registers describing the side-stream scrambler generator polynomials according to the IEEE 802.3ab-1999 standard.

An implementation of master and slave PHY side-stream scramblers by linear-feedback shift registers is shown in FIG. 7. The bits stored in the shift register delay line at time n are denoted by $Scr_n[32:0]$. At each symbol period, the shift register is advanced by one bit, and one new bit represented by $Scr_n[0]$ is generated. The transmitter side-stream scrambler is reset upon execution of the PCS Reset function. If PCS Reset is executed, all bits of the 33-bit vector representing the side-stream scrambler state are arbitrarily set. The initialization of the scrambler state is left to the implementor. In no case shall the scrambler state be initialized to all zeros.

PCS Transmit encoding rules are based on the generation, at time n, of the twelve bits $Sx_n[3:0]$, $Sy_n[3:0]$, and $Sg_n[3:0]$. The eight bits, $Sx_n[3:0]$ $Sy_n[3:0]$, are used to generate the scrambler octet $Sc_n[7:0]$ for decorrelating the GMII data word TXD<7:0> during data transmission and for generating the idle and training symbols. The four bits, $Sg_n[3:0]$, are used to randomize the signs of the quinary symbols ($A_n$, $B_n$, $C_n$, $D_n$) so that each symbol stream has no dc bias. These twelve bits are generated in a systematic fashion using three bits, $X_n$, $Y_n$, and $Scr_n[0]$, and an auxiliary generating polynomial, g(x). The two bits, $X_n$ and $Y_n$, are mutually uncorrelated and also uncorrelated with the bit $Scr_n[0]$. For both master and slave PHYs, they are obtained by the same liner combinations of bits stored in the transmit scrambler shift register delay line. These two bits are derived from elements of the same maximum-length shift register sequence of length $2^{33}-1$ as $Scr_n[0]$, but shifted in time. The associated delays are all large and different so that there is no short-term correlation among the bits $Scr_n[0]$, $X_n$, $Y_n$. The bits $X_n$ and $Y_n$ are generated as follows:

$$X_n = Scr_n[4]\hat{}Scr_n[6]$$

$$Y_n = Scr_n[1]\hat{}Scr_n[5]$$

Where $\hat{}$ denotes XOR logic operator. From the three bits $X_n$, $Y_n$, and $Scr_n[0]$, further mutually uncorrelated bit streams are obtained systematically using the generating polynomial $$g(x)=x^3+x^8$$

The four bits $Sy_n[3:0]$ are generated using the bit $Scr_n[0]$ and g(x) as in the following equations:

$$Sy_n[0]+Scr_n[0]$$

$$Sy_n[1]=g(Scr_n[0])=Scr_n[3]\hat{}Scr_n[8]$$

$$Sy_n[2]=g^2(Scr_n[0])=Scr_n[6]\hat{}Scr_n[16]$$

$$Sy_n[3]=g^3(Scr_n[0])=Scr_n[9]\hat{}Scr_n[14]\hat{}Scr_n[19]\hat{}Scr_n[24]$$

The four bits $Sx_n[3:0]$ are generated using the bit $X_n$ and g(x) as in the following equations:

$$Sx_n[0]=X_n=Scr_n[4]\hat{}Scr_n[6]$$

$$Sx_n[1]=g(X_n)=Scr_n[7]\hat{}Scr_n[9]\hat{}Scr_n[12]\hat{}Scr_n[14]$$

$$Sx_n[2]=g(X_n)=Scr_n[10]\hat{}Scr_n[12]\hat{}Scr_n[20]\hat{}Scr_n[22]$$

$$Sx_n[3]=g^3(X_n)=Scr_n[13]\hat{}Scr_n[15]\hat{}Scr_n[18]\hat{}Scr_n[20]\hat{}Scr_n[23]\hat{}Scr_n[25]\hat{}Scr_n[28]\hat{}Scr_n[30]$$

The four bits $Sg_n[3:0]$ are generated using the bit $Y_n$ and g(x) as in the following equations:

$$Sg_n[0]=Y_n=Scr_n[1]\hat{}Scr_n[5]$$

$$Sg_n[1]=g(Y_n)=Scr_n[4]\hat{}Scr_n[8]\hat{}Scr_n[9]\hat{}Scr_n[13]$$

$$Sg_n[2]=g^2(Y_n)=Scr_n[7]\hat{}Scr_n[11]\hat{}Scr_n[17]\hat{}Scr_n[21]$$

$$Sg_n[3]=g(Y_n)=Scr_n[10]\hat{}Scr_n[14]\hat{}Scr_n[15]\hat{}Scr_n[19]\hat{}Scr_n[20]\hat{}Scr_n[20]\hat{}Scr_n[24]\hat{}Scr_n[25]\hat{}Scr_n[29]$$

By construction, the twelve bits $Sx_n[3:0]$, $Sy_n[3:0]$, and $Sg_n[3:0]$ are derived from elements of the same maximum-length shift register sequence of length $2^{33}-1$ as $Scr_n[0]$, but shifted in time by varying delays. The associated delays are all large and different so that there is no apparent correlation among the bits.

The bits $Sc_n[7:0]$ are used to scramble the GMII data octet TXD[7:0] and for control, idle, and training mode quartet generation. The definition of these bits is dependent upon the bits $Sx_n[3:0]$ and $Sy_n[3:0]$, the variable tx_mode 620 that is obtained through the PMA Service Interface, the variable tx_enable$_n$ 616, and the time index n.

The four bits $Sc_n[7:4]$ are defined as $$Sc_n[7:4] = \begin{bmatrix} Sx_n[3:0] \text{ if } (\text{tx\_enable}_n = 1) \\ [0\ 0\ 0\ 0] \text{ else} \end{bmatrix}$$

The four $Sc_n[3:1]$ are defined as $$Sc_n[3:1] = \begin{bmatrix} [0\ 0\ 0] \text{ if } (\text{tx\_mode} = \text{SEND\_Z}) \\ Sy_n[3:1] \text{ else if } (n - n_0) = 0 \,(\text{mod } 2) \\ (Sy_{n-1}[3:1] \wedge [1111]) \text{ else} \end{bmatrix}$$

where $n_0$ denotes the time index of the last transmitter side-stream scrambler reset.

The bit $Sc_n[0]$ is defined as $$Sc_n[0] = \begin{bmatrix} 0 \text{ if } (\text{tx\_mode} = \text{SEND\_Z}) \\ Sy_n[0] \text{ else} \end{bmatrix}$$

The PCS Transmit function 602 generates a nine-bit word $SC_n$ that represents either a convolutionally encoded stream of data, control, or idle mode code-groups. The convolutional encoder uses a three-bit word $cs_n[2:0]$, which is defined as $$cs_n[1] = \begin{bmatrix} Sd_n[6] \wedge cs_{n-1}[0] \text{ if } (\text{tx\_enable}_{n-2} = 1) \\ 0 \text{ else} \end{bmatrix}$$

$$cs_n[2] = \begin{bmatrix} Sd_n[7] \wedge cs_{n-1}[1] \text{ if } (\text{tx\_enable}_{n-2} = 1) \\ 0 \text{ else} \end{bmatrix}$$

$$cs_n[0] = cs_{n-1}[2]$$

from which $sd_n[8] = cs_n[0]$

The convolutional encoder bits are non-zero only during the transmission of data. Upon the completion of a data frame, the convolutinal encoder bits are reset using the bit csreset$_n$. The bit csreset$_n$ is defined as csreset$_n$=(tx_enable$_{n-2}$) and (not tx_enable$_n$)

The bits $Sd_n[7:6]$ are derived from the bits $Sc_n[7:6]$, the GMII data bits $TXD_n[7:6]$, and from the convolutional encoder bits as $$Sd_n[7] = \begin{bmatrix} Sc_n[7] \wedge TXD_n[7] \text{ if } (csreset_n = 0 \text{ and } \text{tx\_enable}_{n-2} = 1) \\ cs_{n-1}[1] \text{ else if } (csrest_n = 1) \\ Sc_n[7] \text{ else} \end{bmatrix}$$

$$Sd_n[6] = \begin{bmatrix} Sc_n[6] \wedge TXD_n[6] \text{ if } (csreset_n = 0 \text{ and } \text{tx\_enable}_{n-2} = 1) \\ cs_{n-1}[0] \text{ else if } (csrest_n = 1) \\ Sc_n[6] \text{ else} \end{bmatrix}$$

The bits $Sd_n[5:3]$ are derived from the bits $Sc_n[5:3]$ and the GMII data bits $TXD_n[5:3]$ as $$Sd_n[5:3] = \begin{bmatrix} Sc_n[5:3] \wedge TXD_n[5:3] \text{ if } (\text{tx\_enable}_{n-2} = 1) \\ Sc_n[5:3] \text{ else} \end{bmatrix}$$

The bit $Sd_n[2]$ is used to scramble the GMII data bit $TXD_n[2]$ during data mode and to encode loc_revr_status otherwise. It is defined as $$Sd_n[2] = \begin{bmatrix} Sc_n[2] \wedge TXD_n[2] \text{ if } (\text{tx\_enable}_{n-2} = 1) \\ Sc_n[2] \wedge \text{else if } (\text{loc\_rcvr\_status} = \text{OK}) \\ Sc_n[2] \text{ else} \end{bmatrix}$$

The bits $Sd_n[1:0]$ are used to transmit carrier extension information during tx_mode=SEND_N and are thus dependent upon the bits cext_err$_n$. These bits are dependent on the variable tx_error$_n$. These bits are defined as $$cext_n = \begin{bmatrix} \text{tx\_error}_n \text{ if } ((\text{tx\_enable}_n = 0 \text{ and } TXD_n[7:0] = 0x0F)) \\ 0 \text{ else} \end{bmatrix}$$

$$cext_n err_n = \begin{bmatrix} \text{tx\_error}_n \text{ if } ((\text{tx\_enable}_n = 0 \text{ and } TXD_n[7:0] = 0x0F)) \\ 0 \text{ else} \end{bmatrix}$$

$$Sd_n[1] = \begin{bmatrix} Sc_n[1] \wedge TXD_n[1] \text{ if } (\text{tx\_enable}_{n-2} = 0 \\ Sc_n[1] \wedge cext\_err_n \text{ else} \end{bmatrix}$$

$$Sd_n[0] = \begin{bmatrix} Sc_n[0] \wedge TXD_n[0] \text{ if } (\text{tx\_enable}_{n-2} = 1 \\ Sc_n[0] \wedge cext_n \text{ else} \end{bmatrix}$$

The nine-bit word $Sd_n[8:0]$ is mapped to a quartet of quinary symbols ($TA_n$, $TB_n$, $TC_n$, $TD_n$) according to Table 40-1 and Table 40-2 of the IEEE Std. 802.3ab-1999 shown as $Sd_n[6:8]+Sd_n[5:0]$.

The four bits $Sg_n[3]$ are used to randomize the signs of the quinary symbols ($A_n$, $B_n$, ($C_n$, $D_n$) so that each symbol stream has no dc bias. The bits are used to generate binary symbols ($SnA_n$, $SnB_n$, $SnC_n$, $SnD_n$) that, when multiplied by the quinary symbols ($TA_n$, $TB_n$, $TC_n$, $TD_n$) results in ($A_n$, $B_n$, $C_n$, $D_n$).

PCS Transmit 602 ensures a distinction between code groups transmitted during idle mode plus SSD and those transmitted during other symbol periods. This distinction is accomplished by reversing the mapping of the sign bits when the condition (tx_enable$_{n+2}$+tx_enable$_{n-4}$)=1. This sign reversal is controlled by the variable Srev$_n$ defined as Srev$_n$=tx_enable$_{n-2}$+tx_enable$_{n-4}$.

The binary symbols $SnA_n$, $SnB_n$, $SnC_n$, $SnD_n$ are defined using $Sg_n[3:0]$ as $$SnA_n = \begin{bmatrix} +1 \text{ if } [(Sg_n[0] \wedge Srev_n) = 0] \\ -1 \text{ else} \end{bmatrix}$$

$$SnB_n = \begin{bmatrix} +1 \text{ if } [(Sg_n[1] \wedge Srev_n) = 0] \\ -1 \text{ else} \end{bmatrix}$$

$$SnC_n = \begin{bmatrix} +1 \text{ if } [(Sg_n[2] \wedge Srev_n) = 0] \\ -1 \text{ else} \end{bmatrix}$$

$$SnD_n = \begin{bmatrix} +1 \text{ if } [(Sg_n[3] \wedge Srev_n) = 0] \\ -1 \text{ else} \end{bmatrix}$$

The quinary symbols ($A_n$, $B_n$, $C_n$, $D_n$) are generated as the product of ($SnA_n$, $SnB_n$, $SnC_n$, $SnD_n$) and ($TA_n$, $TB_n$, $TC_n$, $TD_n$) respectively.

$A_n = TA_n \times SnA_n$
$B_n = TB_n \times SnB_n$
$C_n = TC_n \times SnC_n$
$D_n = TD_n \times SnD_n$ The PCS Receive function 628 accepts received code-groups provided by the PMA Receive function 630 via the parameter rx_symb_vector 632. To achieve correct operation, PCS Receive uses the knowledge of the encoding rules that are employed in the idle mode. PCS Receive generates the sequence of vectors of four quinary symbols ($RA_n$, $RB_n$, $RC_n$, $RD_n$) and indicates the reliable acquisition of the descrambler state by setting the parameter scr_status to OK. The sequence (RA$_n$, RB$_n$, RC$_n$, RD$_n$) is processed to generate the signals RXD<7:0>634, RX_DV 636, and RX_ER 638, which are presented to the GMII. PCS Receive detects the transmission of a stream of data from the remote station and conveys this information to the PCS Carrier Sense 640 and PCS Transmit functions 642 via the parameter 1000BTreceive 644.

Trellis-Coded Modulation (TCM) is used in the 1000Base-T standard for Gigabit Ethernet for transmission over Category 5 twisted pair copper medium. A 4-dimension (4D) trellis code is used to map incoming bits to symbols as shown in Tables 40-1 and 40-2 of the IEEE Std. 802.3ab-1999. The encoding table requires 768 bytes (512 entries*4 symbols/entry*3 bits/symbol) if implemented as a brute force table lookup. The symbols to bits mapping in the decoder also requires a similar table. However due to the structure of the code a simple combinatorial logic can be used. The derivation of this logic is explained hereinbelow by resort to so-called lattice diagrams, familiar to those knowledgeable to Abstract Algebra Theory. For example, reference may be had to the textbook "A First Course in Abstract Algebra," by John B. Fraleigh, 5$^{th}$ Ed. 1999, published by Addison-Wesley, Reading, Mass.

Figure 8:
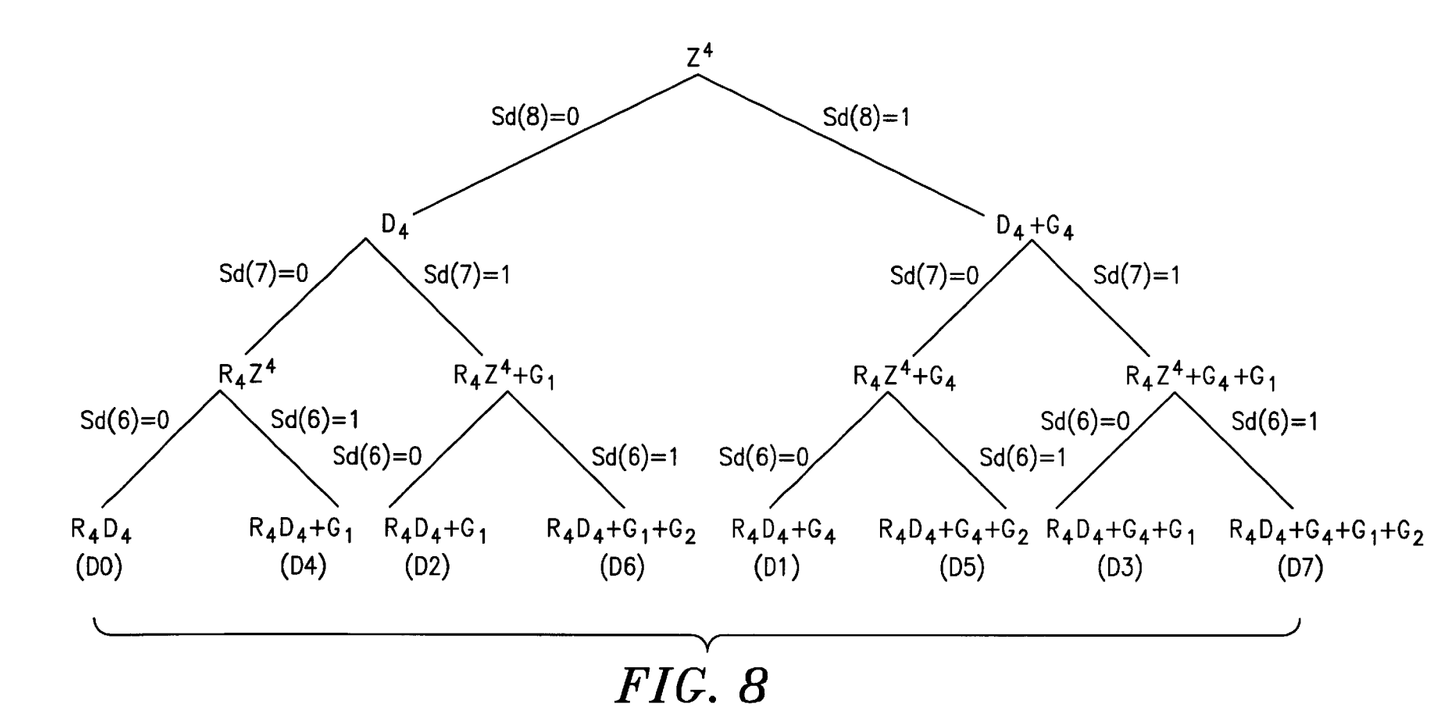
FIG. 8 is a four dimensional (4D) partition tree with Ungerboeck labelling of the eight cosets including the coset leaders $G_0$, $G_1$ and $G_2$.

With reference now to FIG. 8, a lattice diagram shows the subgroups of a group via a group H. Such a line means that H is a subgroup of G. Thus the larger group is placed nearer the top of the diagram. The 4D trellis code is generated by the partition of the lattice $Z^4$ by $R_4D_4$. This partition chain is given by $Z^4/D_4/R_4Z^4/R_4D_4$ with each partition doubling the number of co-sets for a total of 8 $R_4D_4$ cosets. A partition of a group is a decomposition of the group into disjoint subsets. The 8 $R_4D_4$ co-sets called D0, D1, ..., D7 are the subsets identified in Table 40-1 in the 1000Base-T standard. The 4D partition tree with the coset leaders $G_0$, $G_1$ & $G_2$ are shown in FIG. 8. The subsets have been identified in FIG. 8 by their Ungerboeck labels Sd[6:8] in the partition tree. Entries in Table 40-1 can be associated with the following coset leaders $G_0$=[0 0 0 1], $G_1$=[0 0 1 1], & $G_2$=[0 1 1 0].

Signal mapping uses bits Sd[5:0] to select one of 64 4D symbols from the $R_4D_4$ subset chosen among the 8 subsets that are specified by the bits Sd[6:8]. Signal mapping in the $R_4D_4$ subset is non-trivial and hence requires a table lookup. However, $R_4D_4$ may be written as the union of the cartesian set products of two two-dimensional $Z^2$ cosets. For example D0=$(C_2^0 \times C_2^0) \cup (C_2^2 \times C_2^2)$ where x denotes cartesian set-product and U denotes set union. $C_2^0$, $C_2^1$, $C_2^2$, & $C_2^3$ are the two dimensional $Z^2$ lattice and its corresponding cosets which can be trivially mapped since they are from the $Z^2$ lattice. An additional bit Sd[4] is used to partition the lattice $R_4D_4$ by $2Z^4$ with the corresponding co-set leader $G_3$=[1 1 1 1]. Sd[4] then is used to choose one of the two cartesian products that contain the selected signal.

Figure 9:
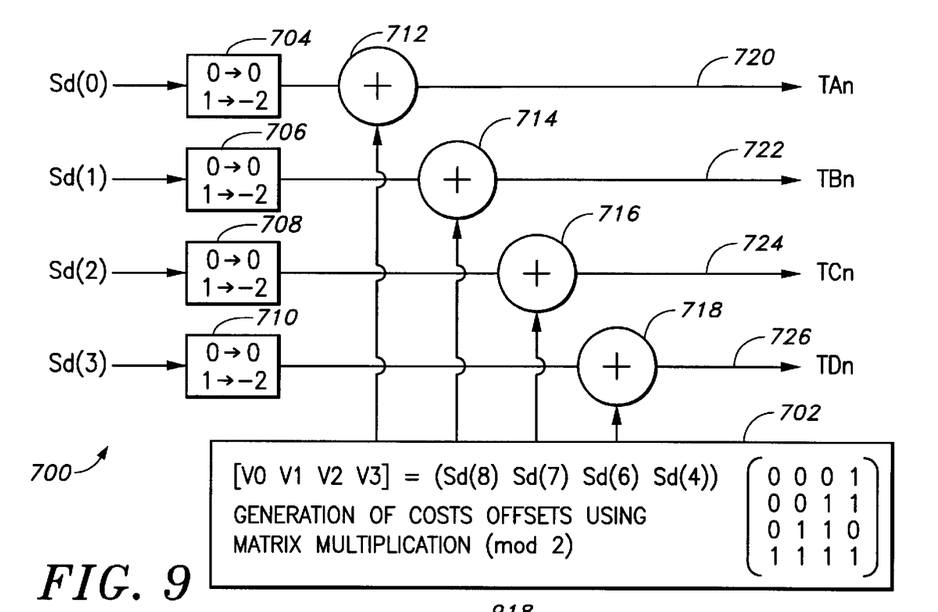
FIG. 9 is a signal flow diagram of a trellis encoder according to the instant invention for the case when Sd[5]=0.

FIG. 9 is a block diagram of a convolutional encoder 700 of the present invention suitable for generating the transmit quinary symbols TA$_n$, TB$_n$, TC$_n$, and TD$_n$ from the nine-bit data word SD[8:0]; implementing the PMA Transmit function 631 required by the IEEE 802.ab-1999 standard if Sd[5]=0. With reference now to FIG. 9, the four bits Sd[8 7 6 4] are input to a coset select part 702 of an encoder 700 to generate the offsets V0, V1, V2, and V3. This mapping is valid when Sd[5]=0 which corresponds to the first thirty-two 4D symbols in each subset in Table 40-1 of the IEEE 802.3ab-1999 standard.

The coset offset obtained from the modulo-2 matrix multiplication of the coset leaders and the bits in the partition tree of block 702 can be implemented by a simpler logic. This logic is derived from block 702 of FIG. 9.

$$V0 = Sd[4]$$
$$V1 = Sd[4] \wedge Sd[6]$$
$$V2 = Sd[4] \wedge Sd[6] \wedge Sd[7]$$
$$V3 = Sd[4] \wedge Sd[7] \wedge Sd[8],$$

where ^ denotes the XOR operator. Equations (1)

Blocks 704, 706, 708 and 710 of FIG. 9 receive the binary signals Sd[0], Sd[1], Sd[2], and Sd[3], respectively, and are translated to 0 or −2 depending on whether they are 0 or 1, respectively. Blocks 712, 714, 716, and 718 receive these respective results and the respective offsets generated by block 702 and generate therefrom the quinary symbols, TA$_n$, TB$_n$, TC$_n$, TD$_n$, by addition. These quinary symbols are carried on wires 720, 722, 724, and 726, respectively. The mapping described in connection with FIG. 9 does not apply when Sd[5]=1 which corresponds to the lower 32 symbols of each subset in Table 40-1 of the IEEE 802.3ab-1999 standard. In particular, bit Sd[4] can no longer be used to select one of the two cartesian set products constituting the $R_4D_4$ lattice by which the signal mapping is accomplished in the lattice $2Z^4$. When Sd[5]=1, the symbol +2 is forced on one of the four wires 720, 722, 724, or 726 without adding any coset lenders. The bits Sd[3:4] determine the wire for placement of the +2, which indirectly chooses one of the two cartesian set products in $R_4D_4$ thereby partitioning $R_4D_4$ by $2Z^4$. The coset leader $G_3$ is selected by a bit called 14 which can be derived from the bits Sd[3:4] and Sd[6:8]. Since +2 is an even symbol, the wire placement of the +2 and the entries of Table I, hereinbelow, can be used to produce a simple lookup table to generate the bit 14. Also when Sd[5]=1, the bit Sd[3] is ignored in the signal mapping part of the trellis encoder.

TABLE I

| Sd[6:3] | Subset | Content | Even/Odd |
|---|---|---|---|
| 000 | D0 | $(C_2^0 \times C_2^0) \cup (C_2^2 \times C_2^2)$ | (EE × EE) U (OO × OO) |
| 001 | D1 | $(C_2^0 \times C_2^3) \cup (C_2^2 \times C_2^1)$ | (EE × EO) U (OO × OE) |
| 010 | D2 | $(C_2^0 \times C_2^2) \cup (C_2^2 \times C_2^0)$ | (EE × OO) U (OO × EE) |
| 011 | D3 | $(C_2^0 \times C_2^1) \cup (C_2^2 \times C_2^3)$ | (EE × OE) U (OO × EO) |
| 100 | D4 | $(C_2^3 \times C_2^1) \cup (C_2^1 \times C_2^3)$ | (EO × OE) U (OE × EO) |
| 101 | D5 | $(C_2^3 \times C_2^2) \cup (C_2^1 \times C_2^0)$ | (EO × OO) U (OE × EE) |
| 110 | D6 | $(C_2^3 \times C_2^3) \cup (C_2^1 \times C_2^1)$ | (EO × EO) U (OE × OE) |
| 111 | D7 | $(C_2^3 \times C_2^0) \cup (C_2^1 \times C_2^2)$ | (EO × EE) U (OE × OO) |

Figure 10:
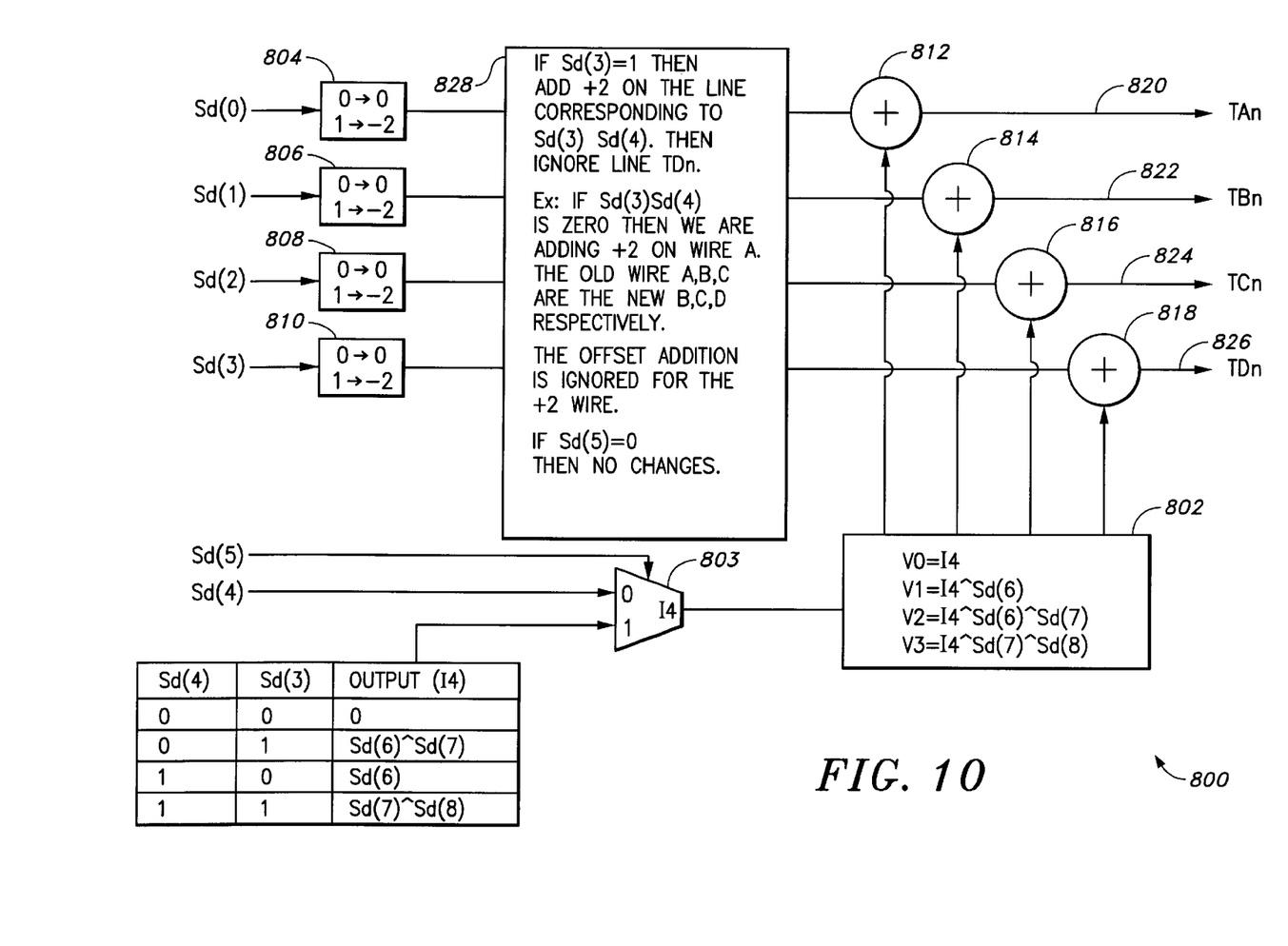
FIG. 10 i signal flow diagram of a trellis encoder according to the instant invention which include special logic for the case when Sd[5]=1.

FIG. 10 is a block diagram of the convolutional encoder 800 of the present invention incorporating the elements of FIG. 9 and including the additional logic required for the case when Sd[5]=1. Element 802 carries over from element 702 of FIG. 9, except that in block 802 bit I4 is now used in place of Sd[4], by virtue of equations (1) to generate the coset offset word V[3:0]. Bit I4 is generated by a combinatorial logic block 802, the output of which is selected by the bit Sd[5]; i.e., Sd[4] is selected as the output, if Sd[5]=0 and the output I4 entry of the look-up table, Table II, hereinbelow, is selected as the output, if Sd[5]=1.

TABLE II

| Sd[4] | Sd[3] | Output (I4) of Block 803, if Sd [5] = 1 |
|---|---|---|
| 0 | 0 | 0 |
| 0 | 1 | Sd[6] ^ Sd[7] |
| 1 | 0 | Sd[6] |
| 1 | 1 | Sd[7] ^ Sd[8] |

The elements 804, 806, 808 and 810 of FIG. 10 carry over directly from elements 704, 706, 708, and 710, respectively, of FIG. 9, as do elements from 812, 814, 816, and 818 from elements 712, 714, 716, and 718, respectively. The four output wires 820, 822, 824, and 826 carry the symbols $TA_n$, $TB_n$, $TC_n$, $TD_n$, respectively.

Finally, a block 828 is included in FIG. 10 as required by the case when Sd[5]=1, as described hereinabove. Block 828 is introduced between the translator blocks 804, 806, 808, and 810 and addition blocks 812, 814, 816, and 818, respectively.

Figure 11:
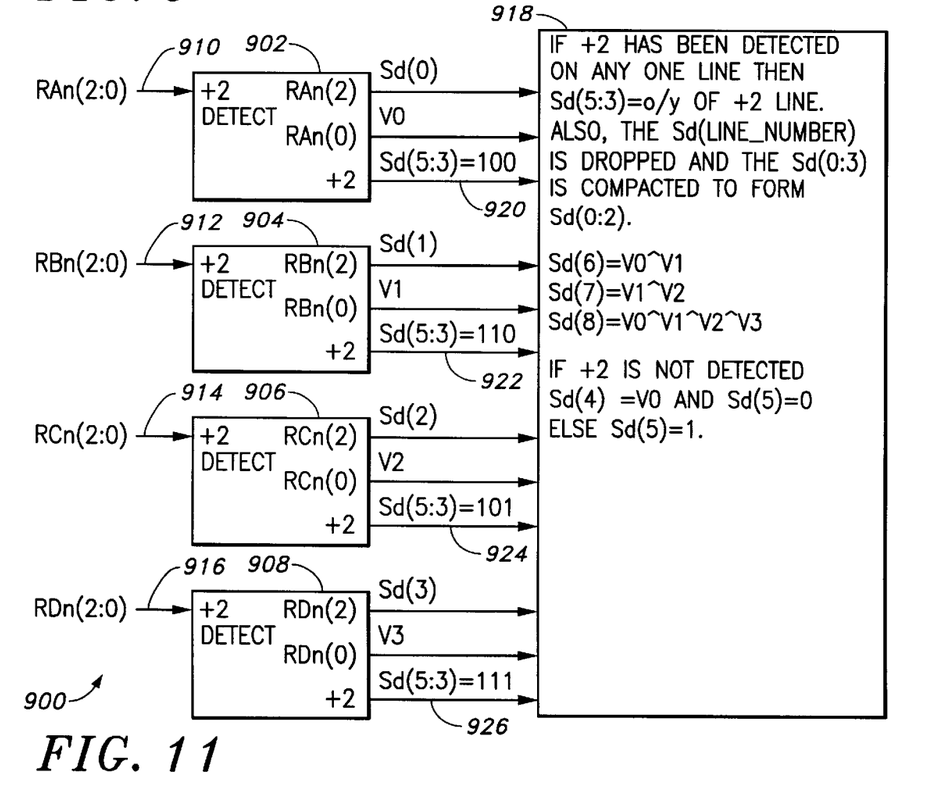
FIG. 11 is a signal flow diagram of a trellis decoder according to the instant invention which includes special logic for the case when a +2 is detected.

FIG. 11 is a block diagram of a convolutional decoder 900 according to the present invention suitable for recovering the nine-bit data word Sd[8:0] from the received quinary symbols $RA_n$, $TB_n$, $TC_n$, $TD_n$ implementing the PMA Receive function 630 required by the IEEE 802.ab-1999 standard. The multi-level signals representing these four symbols are received by blocks 902, 904, 906, and 908, respectively, on the four lines 910, 912, 914, and 916, respectively. The multi-level signals are represented on FIG. 11 and in the following description of FIG. 11 as 3-bit 2's complement numbers.

Block 902 receives $RA_n$ and generates therefrom Sd[0], offset value V0 and values for Sd[5:3] as well as detects a +2 value on line 910. Blocks 904, 906, and 908 perform the same operations on $RB_n$, $RC_n$, $RD_n$, respectively, and generate Sd[1], Sd[2], and Sd[3]; V1, V2, and V3 and values for Sd[5:3], respectively, as described hereinbelow. The values for Sd[3:0] are given by $$Sd[0]=RA_n[2]$$

$$Sd[1]=RB_n[2]$$

$$Sd[2]=RC_n[2]$$

$$Sd[3]=RD_n[2]$$

Since the signal mapping is always of even parity, the decoder derives the coset offsets V0, V1, V2 & V3 from the even/odd parity of the input symbols on the corresponding wire $RA_n$, $RB_n$, $RC_n$, & $RD_n$. This parity is decoded as the LSB of the input symbol when the symbol is represented in 2's complement notation as is known to those skilled in the art. Accordingly, the offset values are given by $$V0=RA_n[0]$$

$$V1=RB_n[0]$$

$$V2=RC_n[0]$$

$$V3=RD_n[0]$$

The bits Sd[4], Sd[6:8] that select the coset leaders in the encoder can be determined from the inverse of the modulo-2 matrix multiplication of FIG. 9, as follows:

$$\left.\begin{array}{l} Sd[4] = V0 \\ Sd[6] = V0 \wedge V1 \\ Sd[7] = V1 \wedge V2 \\ Sd[8] = V0 \wedge V1 \wedge V2 \wedge V3 \end{array}\right\} \quad \text{Equations (2)}$$

The coset offsets do not change the sign of the input symbols. Hence the bits Sd[0:3] can be derived from the sign of the input symbols on the corresponding wire $RA_n$, $RB_n$, $RC_n$, and $RD_n$. In the absence of any +2 symbols the bit Sd[5] is set to 0.

If a +2 symbol is detected on any line 910, 912, 914, or 916, a constant is used to derive the bits Sd[5:3] as shown in FIG. 11. Only one line may carry +2 value at a time index n. Accordingly, if the line 910 carries +2, Sd[5:3]=100. If the line 912 carries +2, Sd[5:3]=110. If the line 914 carries +2, Sd[5:3]=101. If the line 916 carries +2, Sd[5:3]=111. These results are shown as carried to block 918 on lines 920, 922, 924, and 926, respectively. Further shown in block 918, the decoding for the bits Sd[6:8] is the same as in the previous case. However, since Sd[3] is now generated by the block that generated the +2, the four output bits Sd[0:3] are compacted to form Sd[0:2], only three extra bits Sd[0:2] are needed since Sd[3:8] are already known. Since the four blocks generate four bits Sd[0:3], one bit is dropped to get the required three bits; a process called "compaction." For instance, if block 904 detects +2 on line 912, Sd[1], the output from that block is dropped. So four bits have been compacted to three bits; i.e., Sd[0]=Sd[0], Sd[1], Sd[2], and Sd[2]=Sd[3].

What is claimed is:

1. A method of encoding a plural-bit data word as a plurality of multi-level symbols, each having a value selected from a predetermined plurality of levels, comprising the steps of:

a first translation of each of selected bit positions of said data word to one of said levels;

when the contents of a predetermined one of said data word bits is a predetermined value, a second translation of each of said selected data word bit positions to one of said levels;

generating a plural-bit offset word from predetermined bit positions of said data word; and generating said multi-level symbols by addition of said offset word to said translated levels.

2. The encoding method of claim 1 wherein said multi-level symbols are assigned a five-level code, comprising a first, a second, a third, a fourth and a fifth code level, and wherein the first translation step further includes the step:

translating a first predetermined bit value to said third code level and a second predetermined bit value to said second code level.

3. The encoding method of claim 2 wherein said data-word comprises the bits Sd[8:0], said offset-word comprises the bits V0, V1, V2 and V3 and the offset-word generating step further includes the step:

when said contents of said predetermined one of said data word bits is said predetermined value, generating said bits V0, V1, V2 and V3 according to the equations:

$$V0=Sd[4]$$

$$V1=Sd[4] \wedge Sd[6]$$

$$V2=Sd[4] \wedge Sd[6] \wedge Sd[7]$$

$$V3=Sd[4] \wedge Sd[7] \wedge Sd[8],$$

where ^ is the XOR operation.

4. The encoding method of claim 2 wherein said data-word comprises the bits Sd[8:0], said offset-word comprises the bits V0, V1, V2 and V3 and the offset-word generating step further includes the step:

when said contents of said predetermined one of said data word bits is said predetermined value, generating said bits V0, V1, V2 and V3 according to the equations:

$$V0=I4$$

$$V1=I4 \wedge Sd[6]$$

$$V2=I4 \wedge Sd[6] \wedge Sd[7]$$

$V3=I4 \wedge Sd[7] \wedge Sd[8]$, where I4 is assigned a binary value according to the table:

| Sd[4] | Sd[3] | I4 |
|---|---|---|
| 0 | 0 | 0 |
| 0 | 1 | Sd[6] ^ Sd[7] |
| 1 | 0 | Sd[6] |
| 1 | 1 | Sd[7] ^ Sd[8] | where ^ is the XOR operation.

5. The encoding method according to claim 2 wherein each said multi-level symbols is encoded on a predetermined one of four signal lines and wherein said second translation step further includes the steps:

when said contents of said predetermined one of said data word bits is said predetermined value;

adding said fifth code value to one of said signal lines as selected by predetermined bit positions of said data word;

discarding the symbol on said fourth signal line; and selecting the symbols on the remaining three signal lines from the symbols on the lines to which no said fifth code value is added.

6. The encoding method according to claim 3 wherein said code levels are treated as twos-complement numbers, wherein each said multi-level symbols is encoded on a predetermined one of four signal lines and wherein said offset-word addition step includes the step:

twos-complement addition of said offset-word bits to said code-levels on respective ones of said signal lines.

7. The encoding method according to claim 5 wherein said code levels are treated as twos-complement numbers, wherein each said multi-level symbols is encoded on a predetermined one of four signal lines and wherein said offset-word addition step includes the step:

when said contents of said predetermined one of said data word bits is said predetermined value, twos-complement addition of said offset-word bits to said code-levels on respective ones of said signal lines symbols on said three signal lines to which no said fifth code value is added.

8. A method of decoding a plurality of multi-level symbols as a plural-bit data word, each said symbol having a value selected from a five-level code, each said code level treated as a twos-complement number, comprising the steps of:

a translation of each of selected bit positions of said twos-complement representation to predetermined bit positions of said data word;

when the contents of a predetermined bit positions of a twos-complement representation of one of said symbol is a predetermined value, setting of predetermined bit positions of said data word to a selected value;

generating a plural-bit offset word from predetermined bit positions of said twos-complement representation of each of said symbols; and generating predetermined bit positions of said data-word from said offset word to a selected value, dependent on said contents of said predetermined bit positions of a twos-complement representation of one of said symbol being said predetermined value.

9. The decoding method of claim 8 wherein said five-level code comprises a first, a second, a third, a fourth and a fifth code level, wherein said the contents of a predetermined bit positions of a twos-complement representation of one of said symbol is said fifth level, wherein each said multi-level symbols is encoded on a predetermined one of four signal lines, wherein said twos-complement representation of said four multi-level symbols comprises the bits A[2:0], B[2:0], C[2:0] and D[2:0], said data-word comprises the bits Sd[8:0], and wherein the translation step further includes the steps:

A[2]=Sd[0]

B[2]=Sd[1]

C[2]=Sd[2]

D[2]=Sd[3].

10. The decoding method of claim 9 wherein said offset-word comprises the bits V0, V1, V2 and V3 and the offset-word generating step further includes the steps:

V0=A[0]

V1=B[0]

V2=C[0]

V3=D[0].

11. The decoding method of claim 10 wherein the step of setting of predetermined bit positions of said data word to a selected value further includes the steps:

Sd[6]=V0^V1

Sd[7]=V1^V2

Sd[8]=V0^V1^V2^V3, where ^ is the XOR operation.

12. The decoding method of claim 11 wherein when said contents of said predetermined bit positions of said twos-complement represents said fifth code level, the step of setting of predetermined bit positions of said data word to a selected value further includes the steps;

Sd[4]=V0

Sd[5]=0.

13. The decoding method of claim 9 wherein when said contents of said predetermined bit positions of said twos-complement represents said fifth code level, the step of setting of predetermined bit positions of said data word to a selected value further includes the steps;

Sd[5:3]=100, if A[2:0]=said fifth code level, Sd[5:3]=110, if B[2:0]=said fifth code level, Sd[5:3]=101, if C[2:0]= said fifth code level, Sd[5:3]=111, if D[2:0]=said fifth code level; and Sd[0:2] is selected from compacted bits of Sd[0:3], dependent on which of said A[2:0], B[2:0], C[2:0], D[2:0]=said fifth code level.

* * * * *